United States Patent [19]

Bongers

[11] 4,403,525

[45] Sep. 13, 1983

[54] CONNECTING ROD FOR AN ENGINE

[75] Inventor: Bernd Bongers, Kirchheim, Fed. Rep. of Germany

[73] Assignee: Messerschmitt-Bölkow Blohm Gesellschaft mit beschrankter Haftung, Munich, Fed. Rep. of Germany

[21] Appl. No.: 216,248

[22] Filed: Dec. 15, 1980

[30] Foreign Application Priority Data

Dec. 19, 1979 [DE] Fed. Rep. of Germany ........ 2951112

[51] Int. Cl.³ ............................................. G05G 1/00
[52] U.S. Cl. .................................................. 74/579 E
[58] Field of Search ......................... 74/579 R, 579 E

[56] References Cited

U.S. PATENT DOCUMENTS 2,081,982  6/1937  Buchanan ........................ 74/579 E

FOREIGN PATENT DOCUMENTS 719070  10/1965  Canada ............................ 74/579 R
2951111  7/1981  Fed. Rep. of Germany .... 74/579 E
54-20259  2/1979  Japan ................................. 74/579 R
54-71253  6/1979  Japan ................................. 74/579 R

*Primary Examiner*—Kenneth Dorner
*Assistant Examiner*—L. D. Shannon, III
*Attorney, Agent, or Firm*—Toren, McGeady and Stanger

[57] ABSTRACT

A connecting rod for an engine includes a ring-shaped first bearing shell for a crankshaft and a ring-shaped second bearing shell for a piston pin. The bearing shells are spaced apart within the same plane with their axes disposed in parallel relation so that an open space is provided between their facing surfaces. A plurality of belt strands are wrapped around the surfaces of both bearing shells with adjacent strands disposed in spaced relation. Flat plates are positioned between adjacent strands and extend between the bearing shells. Thrust pieces are located between the plates and contact the plates and the facing surfaces of the bearing shells. The belt strands, plates and thrust pieces are formed of fiber-reinforced plastics material.

6 Claims, 4 Drawing Figures

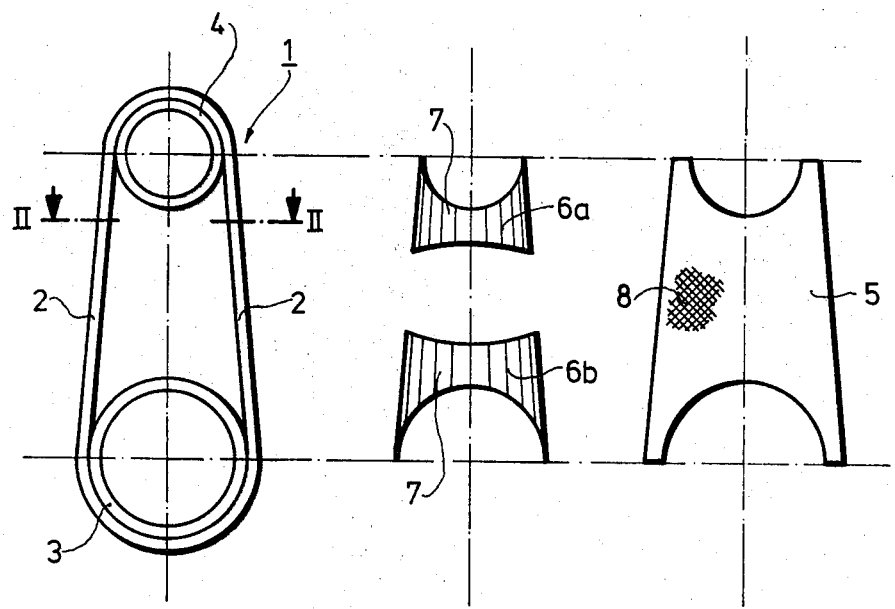
Fig. 1   Fig. 3   Fig. 4
Fig. 2
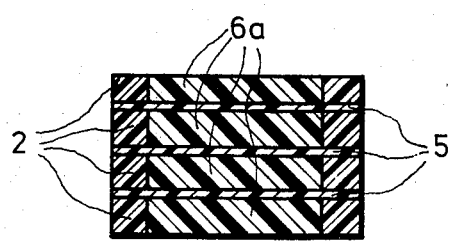

CONNECTING ROD FOR AN ENGINE

SUMMARY OF THE INVENTION

The present invention is directed to a connecting or piston rod for engines including bearing shells for a crankshaft bearing and for a piston pin.

Extremely high acceleration acts on a piston rod in an internal combustion engine running at high speeds and the accelerations develop tension loads, compression loads and bending loads. To absorb such loads, known piston rods are formed of high-strength material, in particular steel. The disadvantage of such material resides in the high inertia forces which must be compensated through other construction measures.

The primary object of the present invention is to provide a connecting rod having a low mass but still capable of withstanding high loads. In accordance with the present invention, the connecting rod is formed of a pair of spaced bearing shells with belt strands wrapped around both of the shells forming an open space between the strands and the facing surfaces of the shells. Adjacent belt strands are disposed in spaced relation and plates are positioned between the strands and extend across the open space within the strands and between the bearing shells. Thrust pieces are positioned between the plates and contact the bearing shells. The thrust pieces may not completely fill the space between the plates. The belt strands, plates and thrust pieces are formed of fiber-reinforced plastics material.

Since the connecting rod is formed of fiber-reinforced plastics materials, except for the bearing shells for the crankshaft and the piston pin, the rod embodying the present invention has a very low mass. Because of its favorable ratio of mass to strength, fiber-reinforced plastics material is especially suited for such a component. Consequently, inertia forces are significantly reduced and the entire crank mechanism is relieved of load. The present invention utilizes these favorable material properties for a connecting or piston rod which makes it possible to introduce in a very advantageous manner the high tension loads, compression loads and bending loads into the reinforcing fibers.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevation view of a connecting rod embodying the present invention;

FIG. 2 is a sectional view, somewhat enlarged, of the connecting rod taken along the line II—II in FIG. 1;

FIG. 3 is an elevational view of thrust pieces incorporated into the connecting rod; and FIG. 4 is a side view of plates forming a part of the connecting rod.

DETAIL DESCRIPTION OF THE INVENTION

A connecting or piston rod 1 is shown in FIG. 1 and has endless belt strands 2 extending around a bearing shell 3 for a crankshaft bearing and a bearing shell 4 for a piston pin with the strand in contact with the surfaces of the shells. The shells 3 and 4 are disposed in a common plane with the axes thereof in spaced parallel relation. The facing surfaces of the bearing shells 3, 4 are disposed in spaced relation so that a space is provided between the facing surfaces of the shells and inwardly of the portions of the strands extending between the shells on the opposite side of the space. As can be seen in FIG. 2, the individual belt strands 2 are disposed in spaced relation, that is, the adjacent strands are spaced apart and a bearing plate 5 is located between each pair of adjacent strands. The plates, as shown in FIG. 4, extend between the facing surfaces of the bearing shells 3, 4 across the space defined between the facing surfaces and the strands so that the width of the plates corresponds to the width between the outside surfaces of the strands between the two shells. The plates 5 extend between the centers of the bearing shells 3, 4, that is, the surfaces of the bearing plates at the opposite ends are rounded to contact the facing surfaces of the bearing shells and the bearing plates terminate along a line extending through the axes of the bearing shells which line extends transversely of the long axis of the connecting rod which extends between the axes of the bearing shells.

As can be seen in FIG. 2, thrust pieces 6a, 6b are located in contact with the bearing plates 5 inwardly of the belt strands 2. The configuration of the thrust pieces is shown in FIG. 3, they are arranged to contact the facing surfaces of the bearing shells. In the embodiment illustrated, however, the thrust pieces 6a, 6b are spaced apart in the long direction of the connecting rod. In other words, within the connecting rod open spaces are provided between the thrust pieces 6a, 6b.

The belt strands 2, bearing plates 5 and thrust pieces 6a, 6b are formed of fiber-reinforced plastics material. The belt strands 2 are wound by means of a winding procedure around the exterior surfaces of the bearing shells 3, 4 and serve to absorb tension forces. As can be seen in FIG. 1, the belt strands contact the surfaces of the two bearing shells 3, 4 which face away from one another. Compression forces are transmitted directly from the bearing shells 3, 4 to the thrust pieces 6a, 6b and these pieces are formed with unidirectional fibers 7, note FIG. 3, which extend in the long direction of the connecting rod.

In connecting rods subjected to very high stresses, the thrust pieces could extend for the full length between the facing surfaces of the bearing shells 3, 4. Preferably, plates 5 have the fibers extending transversely of one another in a crossing arrangement, note detail 8 illustrated in FIG. 4. In this crossing arrangement the crossing fibers are disposed at an angle of 45' relative to one another. As a result, the plates can safely transmit the compression forces from the thrust pieces 6a, 6b to the lateral belt strands 2. Due to the illustrated, multi-layer construction of the connecting rod 1, adhesion surfaces with a sufficiently large area are provided in order to absorb and transmit the tension, compression and bending forces.

Connecting rod 1 is not only useful for divisible crankshafts, it can also be used in one-piece shafts. The connecting or piston rods can be directly integrated with the crankshaft by fabricating the bearing plate 5 with the thrust pieces 6a, 6b and fixing them together with the bearing shells 3, 4 on the crankshaft and, subsequently, covering them along the sides by winding the belt strands 2. Accordingly, after curing, the finished rods are already on the crankshaft.

While specific embodiments of the invention have been shown and described in detail to illustrate the application of the inventive principles, it will be understood that the invention may be embodied otherwise without departing from such principles.

What is claimed is:

1. In a connecting rod for an engine comprising a first annular bearing shell for a crankshaft bearing and a second annular bearing shell for a piston pin, said first and second bearing shells disposed in spaced relation and the axes thereof disposed in laterally spaced parallel relation and said connecting rod having a long axis extending between and transversely of the axes of said first and second bearing shells, said bearing shells each having an annular outer surface with a first portion of each outside surface facing toward other and a second portion of said outside surface facing away from other, a belt strand formed of fiber-reinforced plastics material is wrapped around the second portion of the outside surfaces of said first and second bearing shells and extends between said first and second bearing shells, a bearing plate formed of a fiber-reinforced plastics material extending between said first and second bearing shells and located inwardly of said belt strand, wherein the improvement comprises a plurality of said belt strands wrapped around and extending between said first and second bearing shells, each of said belt strands having a first portion in contact with the second portion of the outside surface of said first bearing shell, a second portion in contact with the second portion of the outside surface of said second bearing shell, and a pair of third portions spaced laterally outwardly from the long axis of said connecting rod and each said third portion extending between one end of said first portion and one end of said second portion of said belt strand which ends are located on the same side of the long axis of said connecting rod, the adjacent surfaces of adjacent said belt strands disposed in spaced relation in the axial direction of said bearing shells, the surfaces of said third portions of said bearing strands facing toward one another and the first portions of the outside surfaces of said shells define a first space, a plurality of said bearing plates located in said first space extending between and in contact with the first portions of the outer surface of said first and second bearing shells and each said bearing plate located between a pair of adjacent said belt strands with the side edges of said bearing plates extending between said bearing shells located between and extending along the outer edges of the third portions of said strands whereby said bearing plates divide the first space into a number of sub-spaces, said bearing plates having a width extending transversely of the long axis of said connecting rod corresponding to the outer dimension between said third portions of said belt strand extending between said bearing shells, thrust pieces located in said sub-spaces between adjacent said plates and located inwardly of said third portions of said belt strands and disposed in bearing contact with the first portions of the outer surface of said first and second bearing shells, and said bearing plates and thrust pieces are formed of fiber-reinforced plastics material.

2. Connecting rod, as set forth in claim 1, wherein said belt strands are endless and comprise fibers wound around the outside surfaces of said first and second bearing shells.

3. Connecting rod, as set forth in claim 1, wherein said bearing plates are formed with fiber layers extending transversely of one another in a crosswise arrangement.

4. Connecting rod, as set forth in claim 3, wherein said fiber layers extend transversely of one another at an angle of 45°.

5. Connecting rod, as set forth in claim 1, wherein said thrust pieces are formed with unidirectional fibers extending parallel to the long axis of said connecting rod.

6. Connecting rod, as set forth in claim 5, wherein a pair of said thrust pieces are located between a pair of said bearing plates with one of said thrust pieces in contact with the first portion of said outside surface of said first bearing shell the other one of said thrust pieces in contact with the first portion of said outside surface of said second bearing shell and said thrust pieces being disposed in spaced relation from one another so that in said sub-space an open space is provided between said thrust pieces.

* * * * *